US005572186A

United States Patent [19]
Traxler et al.

[11] Patent Number: 5,572,186
[45] Date of Patent: Nov. 5, 1996

[54] BOAT SECURITY SYSTEM

[75] Inventors: Norbert Traxler; Sharon Traxler, both of Prior Lake, Minn.

[73] Assignee: C.O.P. Corp., Mankato, Minn.

[21] Appl. No.: 276,301

[22] Filed: Jul. 18, 1994

[51] Int. Cl.$^6$ ............................ B60R 25/10; G08B 23/00
[52] U.S. Cl. ........................ 340/426; 340/425.5; 340/568; 340/984; 340/548; 307/10.2; 200/61.18
[58] Field of Search ..................... 340/548, 568, 340/571, 984, 426, 425.5; 307/10.2; 200/61.18

[56] References Cited

U.S. PATENT DOCUMENTS

| 4,222,032 | 9/1980 | Speer | 340/568 |
|---|---|---|---|
| 4,253,084 | 2/1981 | Topputo | 340/568 |
| 4,274,077 | 6/1981 | Feiger | 340/568 |
| 4,698,615 | 10/1987 | Wilber | 340/568 |
| 4,760,382 | 7/1988 | Faulkner | 340/568 |
| 4,821,025 | 4/1989 | Ross, Sr. | 340/568 |

FOREIGN PATENT DOCUMENTS 2016777  9/1979  United Kingdom ................... 340/548

Primary Examiner—Donnie L. Crosland
Attorney, Agent, or Firm—Haugen and Nikolai, P.A.

[57] ABSTRACT

A security system for protecting a vehicle and its contents including a protective cover having conductors threaded through a hollow seam and electrically connected to a two member electrical connector. Each conductor is connected to a sensing circuit configured to detect an open circuit condition in the conductor-connector loop. In use, the loop is pulled taut around the protected vehicle and secured by a tensioning system while the electrical connector is held together by a temporary restraint system. The loop tension is adjusted and the temporary restraint is released subjecting the connector to the adjusted tension in the conductor. In this state, the security system is ready to detect movement of the protective cover or an open circuit condition.

17 Claims, 3 Drawing Sheets

BOAT SECURITY SYSTEM

BACKGROUND OF THE INVENTION

I. Field of the Invention

This invention relates generally to security systems, and more particularly, to a security or anti-tamper device for detecting the displacement of a vehicle cover situated to protect the vehicle and its contents.

II. Discussion of the Prior Art

In today's affluent society, it is not uncommon for even a person or family of ordinary means to have several cars and also possibly a boat or motorcycle. These vehicles are typically used for transporting people and cargo or for recreational purposes. The cost of these items is often substantial.

Owners of these vehicles usually carry or stow a number of personal property items in them which may be relatively expensive items, such as stereos, cellular telephones, fish detectors or fishing gear, or that may be items of personal value or interest, such as a pendant from a relative or hand-picked fishing lures. Unfortunately, not everyone shares the high moral standards or motivation which require one to purchase or otherwise legally obtain such vehicles and personal items. Instead, some people choose to surreptitiously acquire such items from others. Rightful owners, of course, desire to protect their property from incidents of malfeasance involving others helping themselves to their belongings while they are absent; and, to this end, protective covers have been developed for covering open vehicles and protecting them from the elements, such as the sun, rain, sleet and snow, and keeping intruders at bay.

Protective covers are traditionally made from canvas and may cover the entire vehicle, as in the case of an automobile or motorcycle cover, or only the exposed open area of a vehicle, as in the case of a boat.

Canvas covers are typically held in place with an elastic shock cord or drawstring situated about the periphery of the cover or by snaps positioned on the vehicle. Merely covering the vehicle, however, does little to prevent one so inclined from removing the canvas cover and taking the cover or the vehicle or its contents. To discourage such acts a more sophisticated security system is needed.

To be effective, a security system should somehow scare the would-be thief away from the vehicle and/or alert others in the area to the event of an attempted break-in. Devices for detecting the movement or removal of a cover from a vehicle have been developed and are described in the art. Typically, these systems employ switches attached to the vehicle and triggered by removal of the cover. These switches often activate audio and/or visual alarms for alerting people in the area to an attempted theft and scaring the would-be wrong doer away from the vehicle.

U.S. Pat. No. 4,253,084, issued to Topputo, describes an alarm system having push-button switches protruding through snaps in the body of the vehicle. A protective cover snaps onto the vehicle and urges the switches into an inwardly biased position. Removing a snap while the alarm system is operational triggers a proximate switch and activates an audible alarm. With this system, the switches usually must be mounted through the side of the vehicle. However, many vehicle owners object to having disfiguring holes drilled in the vehicle.

U.S. Pat. No. 4,698,615, issued to Wilber, and U.S. Pat. No. 4,821,025, issued to Ross, Sr. describe systems for detecting the movement of a vehicle cover using spring-biased switches mounted to the vehicle. In Wilber, a switch is held in one position by a clamp attached to a cord. The cord is, in turn, attached to the protective cover situated in place over the vehicle. Removal of the cover causes the cord to pull and remove the clamp from the switch. The spring-biased switch then closes and activates an alarm. In Ross, Sr., a switch is held in one position by a cord threaded through a hole in the side of the vehicle. The cord has a clip removably attached to the deployed protective cover outside the vehicle. Removing the cover releases the clip and allows the spring-biased switch to activate an alarm. In each of these patents, the switches must be mounted to the vehicle. Also, if the switch is mounted on the inside of the vehicle, an undesirable hole must be drilled through the vehicle for the cord.

A system that avoids this problem is described in U.S. Pat. No. 4,222,032, issued to Speer. Speer describes an alarm system having magnetic switches attached to the vehicle and magnets sewn into a protective cover. The cover is placed over the vehicle and the magnets are positioned on the vehicle juxtaposed proximate magnetic switches. Removing any magnet from a magnetic switch activates the alarm. A drawback of this system, however, is that the magnetic coupling holding the cover on the vehicle may not be strong enough to hold the cover in place during, for example, a windstorm. This may lead to false alarms. Another drawback is that a magnet will not attach to non-magnetic materials, such as fiberglass or aluminum, which are the materials of many boats and some cars. Also, with this system a number of switches must be mounted to the vehicle.

A vehicle cover having an anti-tamper device without the need for switches mounted to the vehicle is described in U.S. Pat. No. 4,274,077, issued to Feiger. The anti-tamper device described in Feiger uses a jiggle or mercury switch in which mercury is situated in one position when the switch is vertically oriented and in a second position when the switch is tilted. Opposed poles make electrical contact through a bubble of mercury flowing in and about the poles. In use, the mercury switch is mounted or taped to the protective cover. Removing or tampering with the cover causes the mercury to make electrical contact with the poles and activates an attached alarm. One drawback to this system is that if wind catching the cover moves it, the alarm may go off. Also, if the cover is on a boat in the water, the alarm may be set off from wave action.

It can be seen that there remains a need in the art for an anti-tamper cover apparatus that is non-invasive but substantially weather proof. There is a need for such an apparatus that is relatively uncomplicated and not difficult to deploy.

It is accordingly a principal object of the present invention to provide a security system for protecting a vehicle and its contents from the environment and would-be intruders.

Another object of the invention is to provide a security system that is not invasive to the protected vehicle yet is substantially weather proof with respect to activation.

Yet another object of the invention is to provide a protective cover having a built-in anti-tamper device.

Still another object of the invention is to provide a protective cover having an anti-tamper device which is not activated by normal vibrations in the protective cover.

Other objects, features and advantages of the present invention will become apparent to those skilled in the art through familiarity with the summary of the invention, detailed description, claims, and drawings herein.

SUMMARY OF THE INVENTION

The foregoing objects of the present invention are attained by providing a security system including two conductors threaded in opposite directions in a hollow seam along the periphery of a protective cover. The conductors each have one end connected to a sensing circuit and the other end connected to a resettable electrical connector, such as a banana or bantam plug, to form a conductive loop. The electrical connector has two plug-in portions, one connected to each conductor, that fit together at an opening provided in the seam where the conductors emerge. The conductors and plug device are used in conjunction with two auxiliary restraint or clamping devices which aid in the installation and activation of the security system. The conductors are connected to an electrical component or sensing circuit for detecting and indicating to an alarm that the electrical connector has been pulled apart, i.e. an open circuit state exists.

The conductors and electrical connector must be drawn and held taut around the protected vehicle for the protective cover and conductor arrangement to function properly and serve its purpose. To snug the conductors and electrical connector around the protected vehicle, a temporary mechanical restraint is provided to hold the electrical connector or bantam plug together while the conductors are pulled taut. A second restraint or clamp holds the conductors taut at the point where they emerge from the protective cover to connect to the sense circuit/alarm. In the preferred embodiment, the second clamp is a mechanically (spring) biased clamp around the conductors between the sensing circuit and the opening in the protective cover seam through which the wires emerge. The wires are pulled through the clamp and the clamp is pushed against the opening in the seam to hold the conductors in place.

The temporary mechanical restraint around the electrical connector is then released. The system is then activated and the security system is ready to signal any event that moves the seam of the protective cover with sufficient force to separate the two portions of the electrical connector.

The alarm is activated by anything that breaks the circuit created by the two conductors and the electrical connector. The alarm may be of any type, such as an audible alarm, visual alarm, silent alarm or any combination of the foregoing.

DETAILED DESCRIPTION

Figure 1:
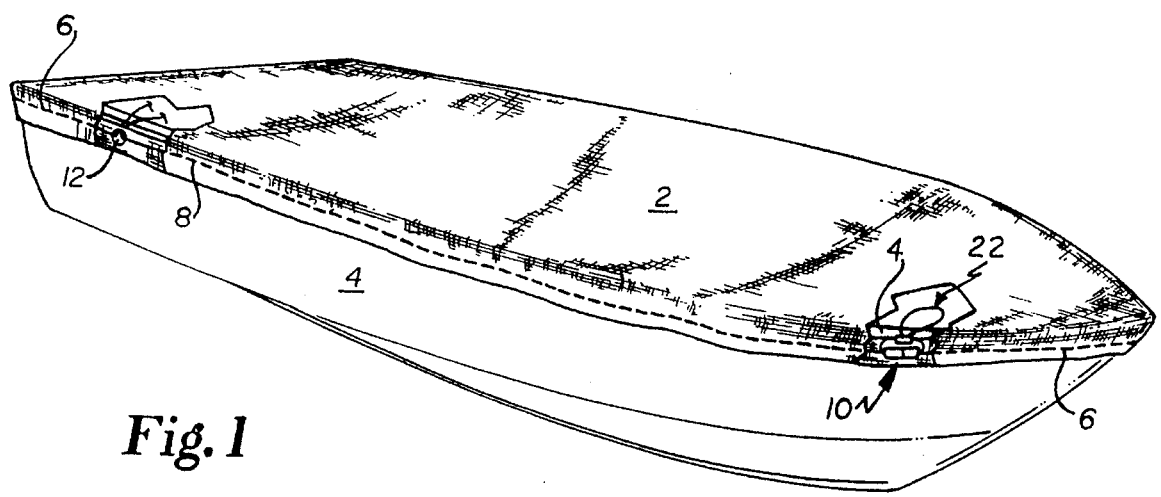
FIG. 1 is a perspective view of a boat employing the security system of the present invention.

The security system of the present invention includes a protective cover that may be configured or designed to fit around any vehicle of interest, including automobiles, boats, motorcycles or aircraft. FIG. 1 shows an example of a preferred embodiment in which the security system is incorporated into a protective cover 2 for a boat 4. The cover 2 is provided with two conductors 6 and 8 threaded through a hollow hem along the periphery of the cover 2. Of course, the conductors 6 and 8 may instead be slidably attached to the periphery of the protective cover 2 in any of many other ways, such as with hooks or loops.

Figure 2:
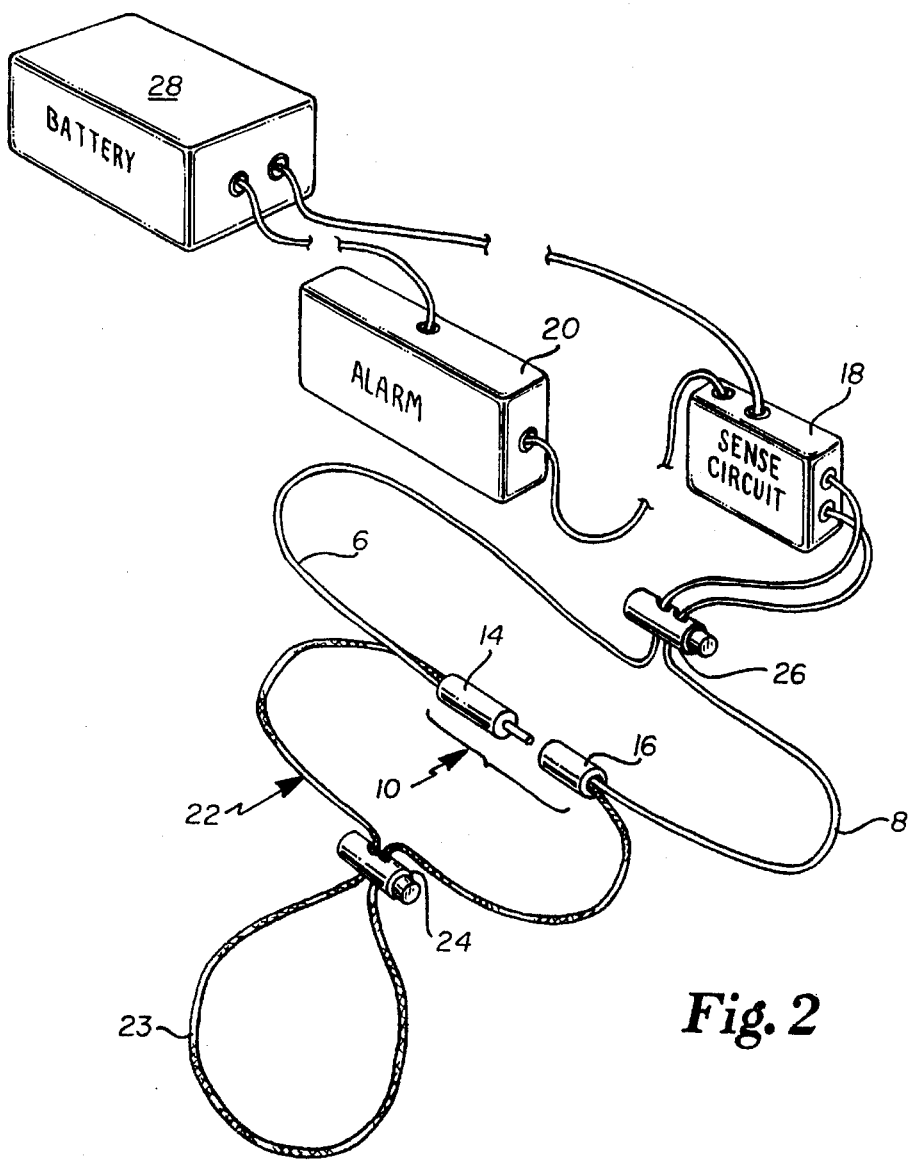
FIG. 2 is an electrical diagram of the circuit of the invention including a sense circuit and alarm.

With reference to FIGS. 1 and 2, the conductors 6 and 8 are connected at one end to separate parts of a two-piece electrical connector, indicated generally at 10. At the other end, the conductors 6 and 8 protrude through an opening 12 in the hemline to connect to a trip or sense circuit 18 (FIG. 2). The electrical connector 10 and the conductors 6 and 8 are pulled taut around the vehicle of interest, in this case a boat 4. As explained below, when the hemline of the protective cover 2 is lifted, the electrical connector 10 separates and an alarm 20 is activated.

As shown in FIG. 2, the electrical connector 10 includes a male component 14 and a female component 16. The electrical connector 10 may be situated on the outside of the hemline for easy access. The conductors 6 and 8 have one end connected to the male and female components 14 and 16, respectively, and the other end connected to an electrical trip or sense circuit 18. The sense circuit 18 is electrically configured to sense an open circuit condition, as when the electrical connector 10 has been separated. The sense circuit 18, upon sensing an open circuit activates the alarm 20 to notify people in the area that someone is moving the cover 2.

Components 14 and 16 are each further physically connected to a restraint or clamping retention means, cord 22, for holding the electrical connector 10 together. The cord 22, as shown in FIG. 2, has one end connected to component 14 and the other end connected to component 16. The electrical connector 10 may be any common plug in type electrical connector of the desired disconnect tension range and it has been found that a banana or bantam plug connector works well. The retention means or cord 22 has a spring-biased clamp 24 or restraint device slidably fit over a loop formed by cord 22. To bias components 14 and 16 of the electrical connector 10 in the connected state, the spring-biased clamp 24 is slid toward the electrical connector 10 while pulling the loop 23 of cord 22 through the spring-biased clamp 24.

Figure 3:
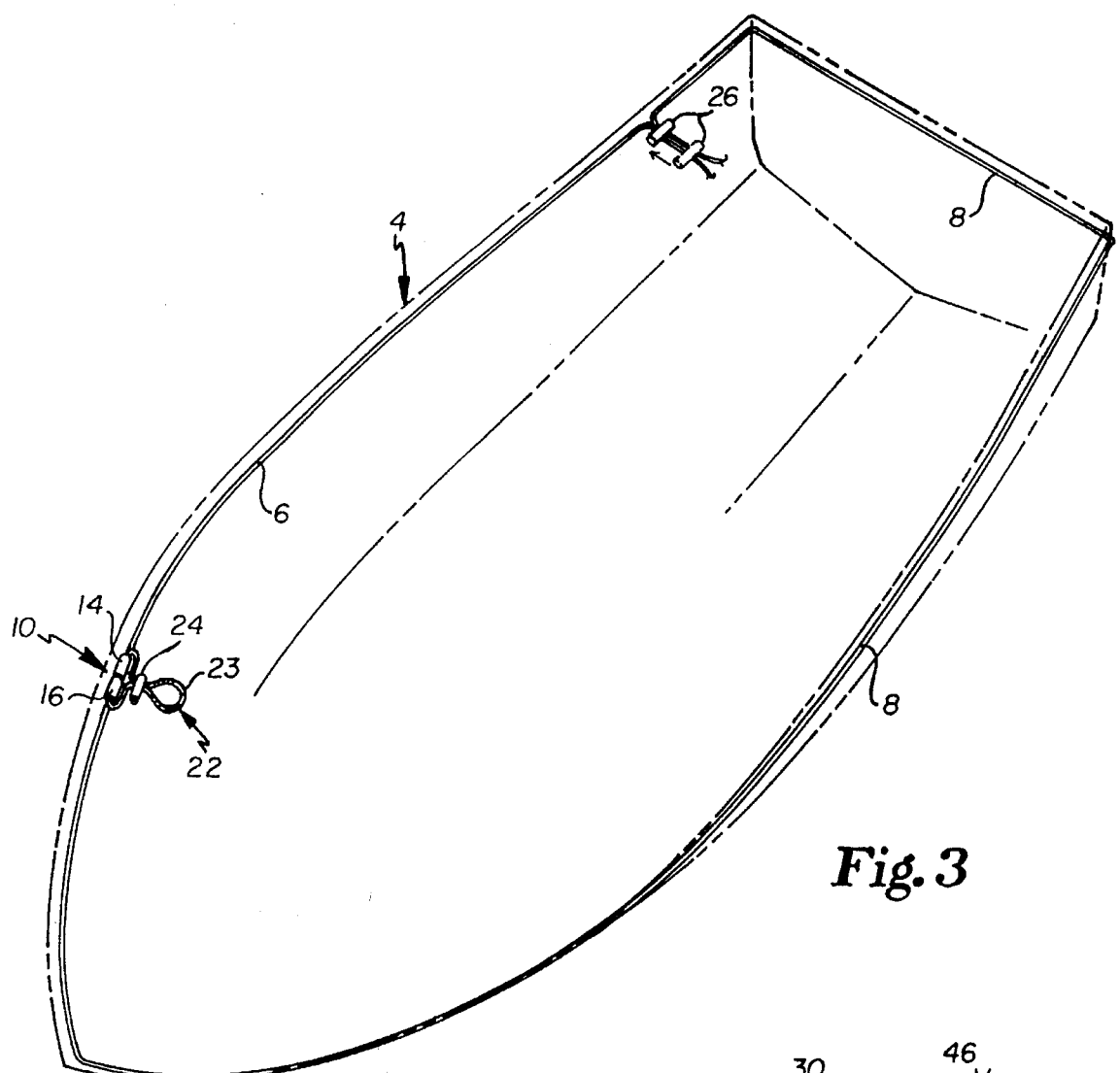
FIG. 3 is a top plan view of the invention as it is secured around a boat, shown in phantom, and not showing the canvas cover.

In FIG. 3, the conductors 6 and 8 are wrapped around the boat 4 and components 14 and 16 are connected. The loop 23 of cord 22 is pulled through the spring-biased clamp 24 to move the clamp 24 toward the electrical connector 10. This provides auxiliary force to bias components 14 and 16 in the connected position enabling conductors 6 and 8 to be pulled taut around the vehicle of interest, here a boat 4, without fear of disconnecting the plug 10.

The conductors 6 and 8 can be pulled taut around the boat while the spring-biased clamp 24 and cord 22 securely maintain the integrity of the electrical connection. The conductors 6 and 8 are pulled through the opening 12 and a second spring-biased clamp 26 is moved to fit against the protective cover 2 and hold the conductors 6 and 8 taut.

Figure 4:
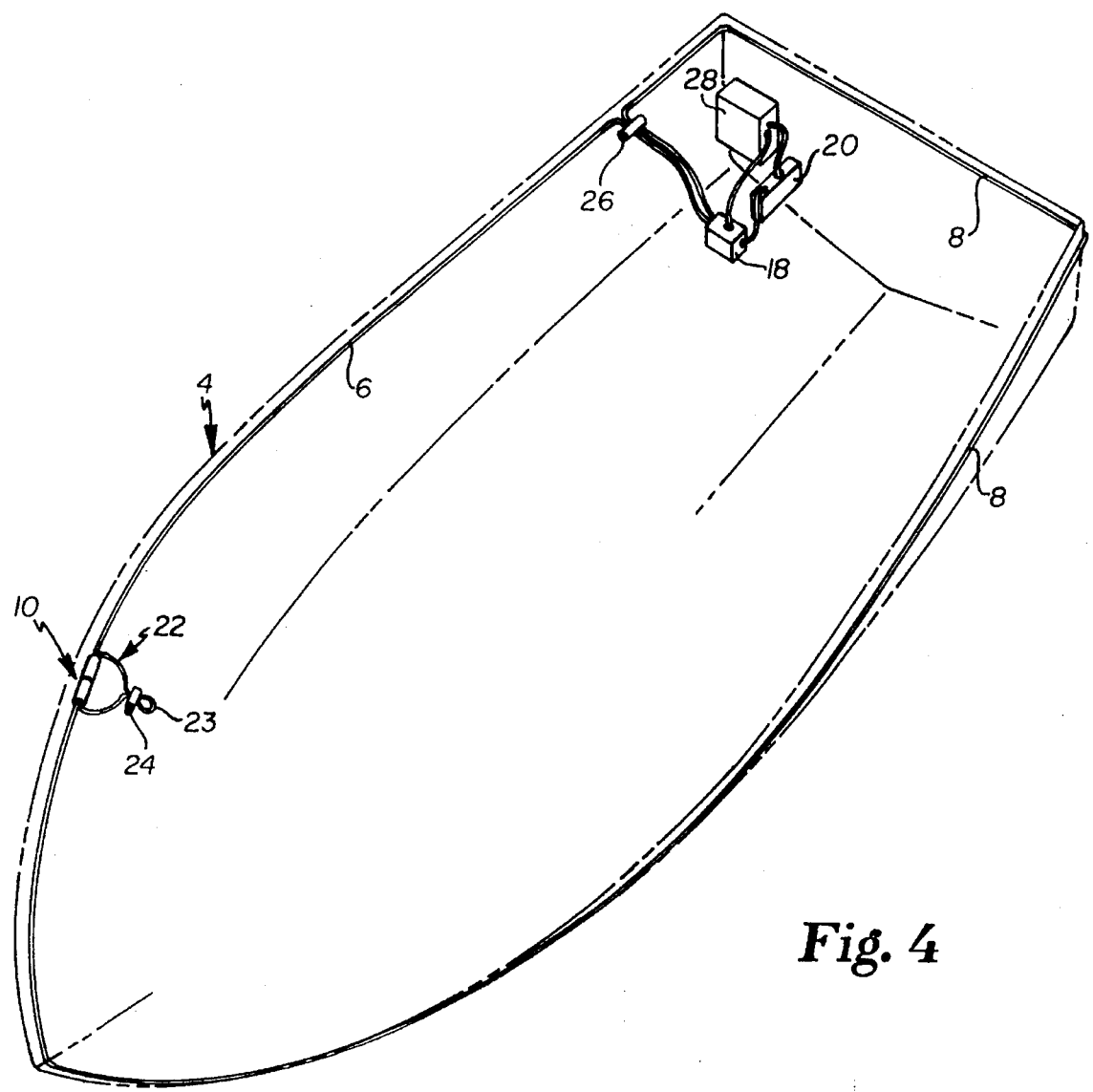
FIG. 4 is a top plan view of the invention secured around a boat and set for triggering the alarm, but not showing the canvas cover.

As shown in FIG. 4, the spring-biased clamp 24 is thereafter pulled away from the electrical connector 10 to loosen the cord 22 and release the bias force applied to connector 10. The second spring-biased clamp 26 continues the desired applied tension in conductors 6 and 8 and the electrical connector 10, holding the assembly snugly around the boat 4. In this state, the electrical connector 10 is disconnected if either conductor 6 or 8 is pulled away from the boat 4, i.e. the minimum additional tension is exceeded.

It will be appreciated that once properly placed and positioned, the system will be sensitive even to acts such as one attempting to slip an arm beneath the circuit loop. On the other hand, the system is position insensitive and relatively immune to weather related disturbances.

Conductors 6 and 8 are also connected to sense circuit 18 which sends a signal to any selected conventional alarm 20 if the circuit opens, e.g. if the electrical connector 10 is pulled apart or if the electrical conductors 6 or 8 are severed. The sense circuit 18 and the alarm 20 may be powered by a battery in the vehicle.

Figure 5:
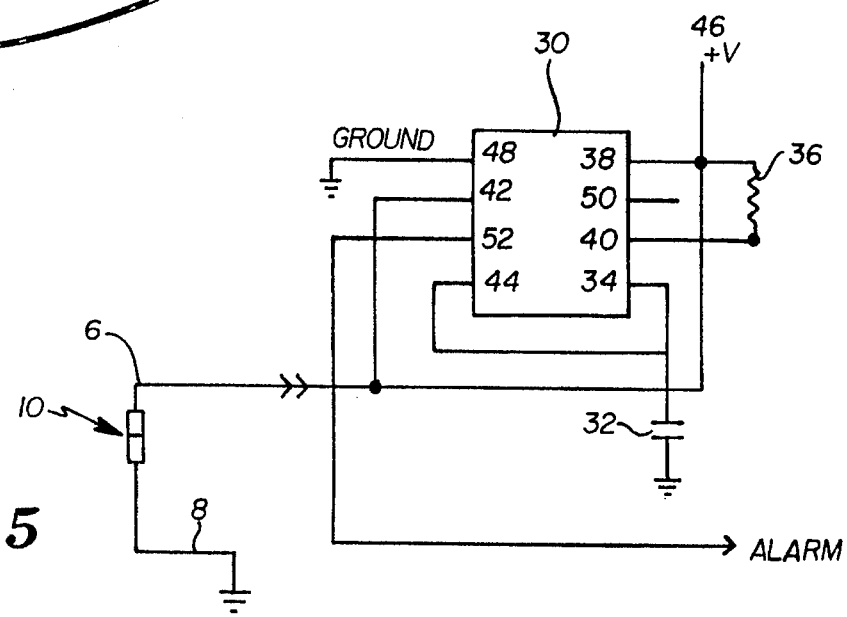
FIG. 5 is an electrical schematic view of one sense circuit that may be used.

The sense circuit 18 may be any conventional circuit for detecting a break in a conductive loop, i.e. an open circuit. In a preferred embodiment, as shown in FIG. 5, the sense circuit is a Signetics NE 555 timer circuit. The required current draw for this circuit is quite low, about 3 milliamperes. This supply current requirement may be reduced still further by using a complementary metal oxide (CMOS) 555 timer chip such as a Texas Instruments TLC 555C or the Maximum ICM 7555 IPA chip. If one of these CMOS versions is used, the supply current would be on the order of 120 microamperes. The preferred working temperature range for all of the above chips is 0° C. to 7° C.

FIG. 5 illustrates a possible associated integrated circuit 30 that has 8 inputs and outputs around its periphery. Pin 40 is connected to the trigger pin 42 and also to the conductive loop including the two conductors 6 and 8 and the electrical connector 10. The conductive loop is connected to pin 42 at one end and to ground at the other end. A reset pin 44 is tied to VCC 46 and the VCC supply pin 38. This prevents the integrated circuit 30 from being accidentally reset and assures that output pin 52 begins in a logic high state. Output pin 52 is tied to the alarm 20. A 150 kilo-ohm resistor 36 is connected between a VCC supply pin 38 and a threshold pin 40 and, to protect the integrated circuit 30 from noise, a 0.0056 microfarad capacitor 32 is connected between control pin 34 and ground. The ground pin 48 of the integrated circuit is tied to ground and a second output pin 50 is left floating.

In operation, the integrated circuit 30 monitors the conductive loop by sensing whether the loop is tied to ground. At startup, pins 40 and 42 are low (0 volts) and the VCC voltage drop is entirely across the 150 kilo-ohm resistor 36. If the electrical connector 10 be separated, the voltage at pins 40 and 42 rises to the VCC voltage. This triggers the integrated circuit 30 and changes the output 52 from a logic high to a logic low voltage. The trigger pin 42 triggers at approximately 1.7 volts. The output 52 remains in a logic low state until the electrical connector 10 is reconnected. The change of the output pin 52 from a logic high level to a logic low level activates the alarm 20 to perform the desired alarm function, such as to alert people in the area that the electrical connector 10 has been separated.

To install the system on the boat 4, the protective cover 2 is placed over the boat 4 and the spring-biased clamp 24 is snugly secured against the electrical connector 10. The second spring-biased clamp 26 is then moved against the protective cover 2 and the conductors 6 and 8 are pulled through the second clamp 26 until the conductors 6 and 8 are sufficiently taut around the boat 4. The spring-biased clamp 24 and the cord 22 are then loosened, releasing the electrical connector 10 and the conductors 6 and 8 are plugged into the sense circuit 18. In this state, the security system is ready to detect movement of the protective cover 2 along and about its periphery.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. An anti-tamper system for a deployed vehicle cover, comprising a continuous conductive loop, said loop, including and being electrically completed through, a position insensitive, manually reconnectable, tension sensitive, disconnect device, said loop further being attached to said deployed vehicle cover in a manner such that tension associated with peripheral movement of said deployed vehicle cover, causes said disconnect device to separate thereby interrupting said continuous conductive loop, said interruption causing a tampering event to be registered.

2. The anti-tamper system as in claim 1, wherein said conductive loop slides within a peripheral hem of the deployed vehicle cover, independent of the deployed vehicle cover.

3. The anti-tamper system as in claim 1, wherein said conductive loop is securely attached to the deployed vehicle cover.

4. The anti-tamper system as in claim 1, wherein any open loop condition causes a tampering event to be registered.

5. The anti-tamper system as in claim 1, further comprising loop tension adjustment means for establishing and maintaining said conductive loop in a taut condition.

6. The anti-tamper system as in claim 5 wherein said loop tension adjustment means includes a spring-loaded clamp.

7. The anti-tamper system as in claim 6 wherein said spring-loaded clamp is threaded over a portion of said loop.

8. The anti-tamper system as in claim 1, wherein said disconnect device is a bantam plug.

9. The anti-tamper system as in claim 1, wherein said vehicle is a boat having an open top.

10. A security system for indicating the movement of a deployed vehicle cover, comprising:
    (a) an electrical circuit comprising a continuous generally peripheral conductive loop in direct contact with the deployed vehicle cover;
    (b) loop tension adjustment means for tightening and maintaining said conductive loop in a taut state;
    (c) tension sensitive, manually resettable, position insensitive electrical device connected in series with said conducive loop such that tension associated with lateral displacement of said conductive loop disconnects said electrical device to interrupt the circuit; and
    (d) alarm means, in communication with said electrical device through said conductive loop for communicating the circuit interruption.

11. The security system as in claim 10, wherein said electrical device is a bantam plug.

12. The security system as in claim 10, wherein said conductive loop slides inside a fold of the deployed vehicle cover thereby remaining independent of the deployed vehicle cover.

13. The security system as in claim 10, wherein said conductive loop is securly attached to the deployed vehicle cover.

14. The security system as in claim 10, wherein said loop tension adjustment means for maintaining said conductive loop in a taut state comprises a spring-loaded clamp.

15. The anti-tamper system as in claim 14, wherein said spring-loaded clamp is threaded over a portion of said loop.

16. The anti-tamper system as in claim 10, wherein said vehicle is a boat having an open top.

17. A security system for indicating the movement of a deployed vehicle cover, comprising:
(a) an electrical circuit comprising a continuous generally peripheral conductive loop in direct contact with the deployed vehicle cover;
(b) loop tension adjustment means for tightening and maintaining said conductive loop in a taut state;
(c) tension sensitive, manually resettable, position insensitive electrical plug device connected in series with said conducive loop such that tension associated with lateral displacement of said conductive loop separates said plug to interrupt the circuit; and
(d) alarm means, in communication with said electrical plug device through said conductive loop for communicating the circuit interruption.

* * * * *